US010035500B2

(12) United States Patent
Stenlåås et al.

(10) Patent No.: US 10,035,500 B2
(45) Date of Patent: Jul. 31, 2018

(54) REGULATION OF CONCENTRATION/FRACTION OF SUBSTANCES IN AN EXHAUST STREAM (71) Applicant: SCANIA CV AB, Södertälje (SE)

(72) Inventors: Ola Stenlåås, Södertälje (SE); Fredrik Roos, Segeltorp (SE)

(73) Assignee: SCANIA CV AB (SE)

(*) Notice: Subject to any disclaimer, the term of this patent is extended or adjusted under 35 U.S.C. 154(b) by 150 days.

(21) Appl. No.: 14/433,110

(22) PCT Filed: Oct. 2, 2013

(86) PCT No.: PCT/SE2013/051146
§ 371 (c)(1),
(2) Date: Apr. 2, 2015

(87) PCT Pub. No.: WO2014/055019
PCT Pub. Date: Apr. 10, 2014

(65) Prior Publication Data
US 2015/0239453 A1  Aug. 27, 2015

(30) Foreign Application Priority Data

Oct. 2, 2012  (SE) ........................................ 1251106
Oct. 2, 2013  (SE) ........................................ 1351154

(51) Int. Cl.
*B60W 10/06*  (2006.01)
*B60W 10/30*  (2006.01)
(Continued)

(52) U.S. Cl.
CPC ............ *B60W 10/06* (2013.01); *B60W 10/02* (2013.01); *B60W 10/10* (2013.01); *B60W 10/30* (2013.01);
(Continued)

(58) Field of Classification Search
CPC ...... B60W 10/06; B60W 10/10; B60W 10/30; B60W 10/02; F02D 41/405
See application file for complete search history.

(56) References Cited

U.S. PATENT DOCUMENTS 4,408,293 A * 10/1983 Avins ..................... B60K 31/10
180/179
5,588,888 A * 12/1996 Magharious ........... B63H 21/32
181/235
(Continued)

FOREIGN PATENT DOCUMENTS

DE   10 2004 017115 A1   10/2005
EP   0 474 401           3/1992
(Continued)

OTHER PUBLICATIONS

International Search Report dated Feb. 7, 2014 issued in corresponding International patent application No. PCT/SE2013/051146.
(Continued)

*Primary Examiner* — Redhwan K Mawari
*Assistant Examiner* — Rodney P King
(74) *Attorney, Agent, or Firm* — Ostrolenk Faber LLP (57) ABSTRACT A method for regulation of a concentration/fraction of one or several substances in an exhaust stream in a motor vehicle through control of its driveline. The motor vehicle includes a driveline comprising a combustion engine; a driveline comprising a combustion engine connected to a gearbox, and an exhaust system for removal of an exhaust stream from the engine. The method includes the step: controlling the driveline for activation or deactivation of coasting of the vehicle based on one or several first parameters $P_1$ for the regulation of a concentration/fraction $C_{EX}/X_{EX}$ of one or several substances $T_{EX}$ in the exhaust stream, where at least one of the or several first parameters $P_1$ are a first concentration/fraction difference between the first concentration/

(Continued)

fraction $C_1/X_1$ in the exhaust stream and a reference concentration/fraction $C_{Ref}/X_{Ref}$. Further, a computer program, a computer program product, a system and a motor vehicle such a system are disclosed.

23 Claims, 5 Drawing Sheets (51) Int. Cl.
    *B60W 10/10*     (2012.01)
    *B60W 10/02*     (2006.01)
    *F02D 41/02*     (2006.01)
    *F02D 41/40*     (2006.01)
    *F02D 11/10*     (2006.01)
    *F02D 31/00*     (2006.01)
    *F02D 41/00*     (2006.01)
    *B60W 30/18*     (2012.01)
    *F02G 3/02*     (2006.01)
    *F02K 3/06*     (2006.01)
    *F16H 61/00*     (2006.01)
    *F16H 61/02*     (2006.01)

(52) U.S. Cl.
    CPC ..... *B60W 30/18072* (2013.01); *F02D 11/105* (2013.01); *F02D 31/001* (2013.01); *F02D 41/0002* (2013.01); *F02D 41/005* (2013.01); *F02D 41/021* (2013.01); *F02D 41/405* (2013.01); *B60W 2030/1809* (2013.01); *B60W 2510/06* (2013.01); *B60W 2530/12* (2013.01); *B60W 2710/06* (2013.01); *B60Y 2300/18083* (2013.01); *B60Y 2300/472* (2013.01); *B60Y 2300/476* (2013.01); *B60Y 2400/432* (2013.01); *F02G 3/02* (2013.01); *F02K 3/06* (2013.01); *F16H 2061/0018* (2013.01); *F16H 2061/0232* (2013.01); *Y02T 10/42* (2013.01); *Y02T 10/44* (2013.01); *Y02T 10/47* (2013.01); *Y02T 10/54* (2013.01); *Y02T 10/76* (2013.01)

(56) References Cited

U.S. PATENT DOCUMENTS

| | | | |
|---|---|---|---|
| 6,154,701 A | 11/2000 | Loffler et al. | 701/54 |
| 6,983,726 B1* | 1/2006 | Luo | B60H 1/00314 123/179.2 |
| 7,628,009 B2 | 12/2009 | Hu | 477/100 |
| 2003/0037538 A1* | 2/2003 | Rendahl | F01N 11/00 60/276 |
| 2004/0020194 A1 | 2/2004 | Nishimura | 60/297 |
| 2004/0035402 A1* | 2/2004 | Collins | F02D 13/0215 123/568.14 |
| 2004/0261401 A1* | 12/2004 | Ohkl | F01N 3/0222 60/285 |
| 2006/0020386 A1* | 1/2006 | Kang | F02D 13/0249 701/114 |
| 2009/0301451 A1 | 12/2009 | Ito | 123/674 |
| 2010/0324790 A1* | 12/2010 | Wurthner | B60W 10/02 701/54 |
| 2011/0000191 A1* | 1/2011 | Scappatura | B01D 53/9454 60/274 |
| 2011/0120100 A1* | 5/2011 | Yin | B01J 21/04 60/295 |
| 2011/0202253 A1 | 8/2011 | Perry et al. | 701/102 |
| 2012/0046841 A1 | 2/2012 | Wurthner et al. | |
| 2012/0216509 A1 | 8/2012 | Sujan et al. | 60/274 |
| 2013/0036670 A1* | 2/2013 | McAlister | C10L 1/00 48/197 R |
| 2013/0190945 A1* | 7/2013 | Koto | G06F 17/00 701/1 |

FOREIGN PATENT DOCUMENTS

| | | |
|---|---|---|
| EP | 2 381 076 | 10/2011 |
| EP | 2 591 968 A2 | 5/2013 |
| GB | 1242590 | 8/1971 |
| WO | WO 2005/090834 | 9/2005 |
| WO | WO 2011/160878 A1 | 12/2011 |

OTHER PUBLICATIONS

International Preliminary Report on Patentability dated Jan. 7, 2015 issued in corresponding International patent application No. PCT/SE2013/051146.

International Search Report dated Feb. 7, 2014 in corresponding PCT International Application No. PCT/SE2013/051148.

\* cited by examiner

REGULATION OF CONCENTRATION/FRACTION OF SUBSTANCES IN AN EXHAUST STREAM

CROSS-REFERENCE TO RELATED APPLICATIONS

The present application is a 35 U.S.C. §§ 371 national phase conversion of PCT/SE2013/051146, filed Oct. 2, 2013, which claims priority of Swedish Patent Application No. 1251106-9, filed Oct. 2, 2012, the contents of which are incorporated by reference herein and Swedish Patent Application No. 1351154-8, filed Oct. 2, 2013, the contents of which are incorporated by reference herein. The PCT International Applications were published in the English language.

TECHNICAL FIELD

The present invention pertains to a method for the regulation of a concentration/fraction of one or several substances comprised in an exhaust stream by way of control of a motor vehicle's driveline. Further, the invention pertains to a computer program, a computer program product, a system and a motor vehicle comprising such a system.

BACKGROUND OF THE INVENTION

Laws and regulations for exhaust emission from motor vehicles have been drafted in many jurisdictions because of pollution and air quality, primarily in urban areas. These laws and regulations often consist of sets of requirements which define acceptable limits for exhaust emissions (emission standards) for motor vehicles equipped with combustion engines. For example, emission levels of nitrogen oxides ($NO_x$), hydrocarbons (HC), carbon monoxide (CO) and particles are often regulated for most types of vehicles.

In order to meet such emission standards, the exhausts caused by the combustion in combustion engines are aftertreated (purified). By way of example, a so-called catalytic purification process may be used, which is why aftertreatment systems usually comprise a catalyst. Further, aftertreatment systems may alternatively or in combination with one or several catalysts comprise other components, such as one or several particulate filters.

Figure 1:
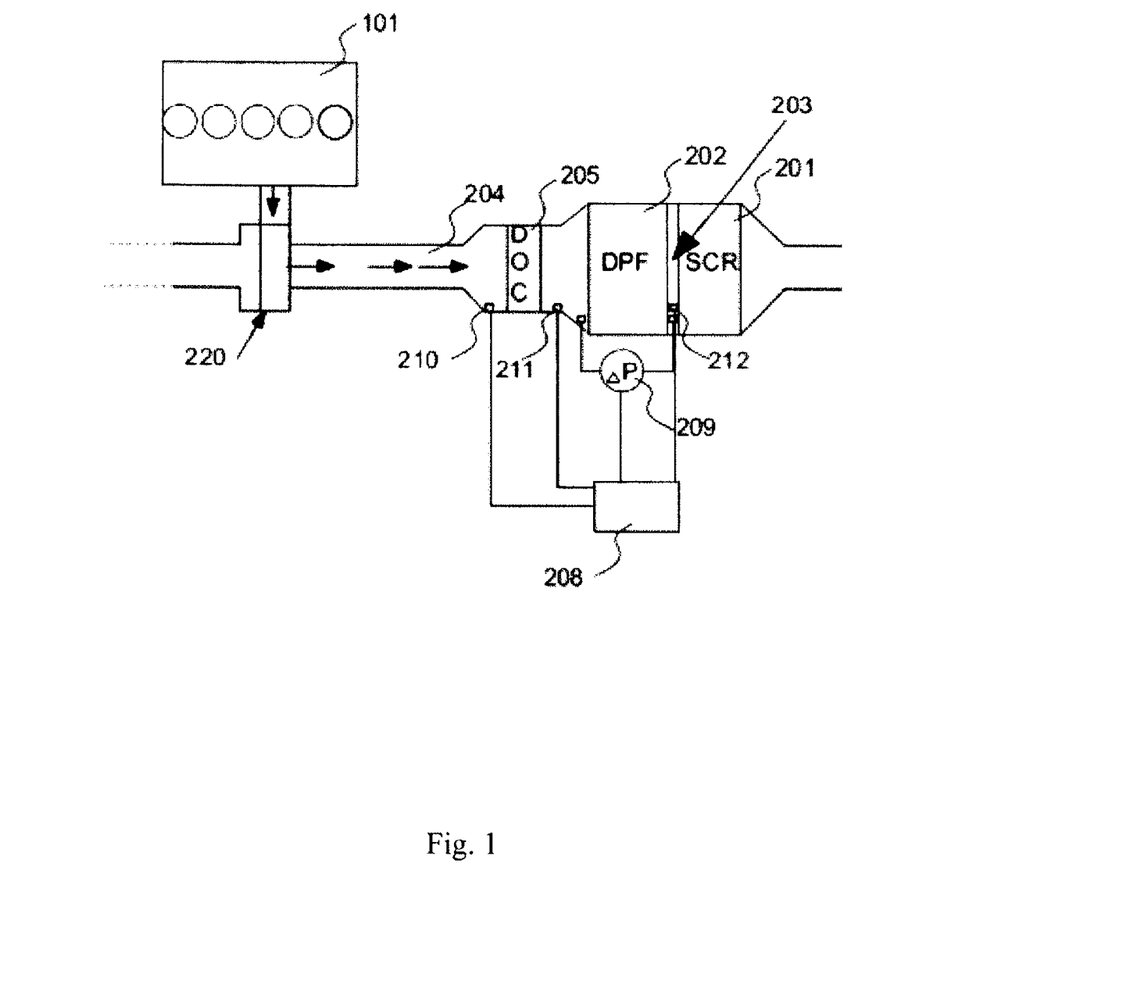
FIG. 1 is a schematic diagram of a system comprising a combustion engine and an exhaust system.

FIG. 1 shows the combustion engine 101 of a motor vehicle 100, where the exhaust stream generated by the combustion is led via a turbocharger 220. The exhaust stream is subsequently led via a pipe 204 (indicated with arrows) to a particulate filter (Diesel Particulate Filter, DPF) 202 via a diesel oxidation catalyst (DOC) 205. Further, the aftertreatment system comprises an SCR catalyst 201 (Selective Catalytic Reduction, SCR), arranged downstream of the particulate filter 202, which uses ammonia ($NH_3$), or a composition from which ammonia may be generated/formed, as an additive for the reduction of the quantity of nitrogen oxides $NO_x$. The particulate filter 202 may alternatively be arranged downstream of the SCR catalyst 201. The diesel oxidation catalyst DOC 205 has several functions and uses the surplus of air which the engine process generally creates in the exhaust stream as a chemical reactor jointly with a precious metal coating in the diesel oxidation catalyst. The diesel oxidation catalyst is normally primarily used to oxidise remaining hydrocarbons and carbon monoxide in the exhaust stream into carbon dioxide, water and heat, and conversion of nitrogen monoxide into nitrogen dioxide.

In connection with combustion of fuel in the combustion engine's combustion chamber (cylinders), soot particles are formed. For this reason, the particulate filter is used to catch soot particles and thus functions so that the exhaust stream is led through a filter structure where soot particles are caught from the passing exhaust stream and stored in the particulate filter. The particulate filter is filled with soot as the vehicle is driven and sooner or later the filter must be emptied of soot, which is usually achieved with the help of so-called regeneration. The regeneration entails that the soot particles (mainly carbon particles) are converted into carbon dioxide and/or carbon monoxide in one or several chemical processes. Regeneration may occur in various ways and may for example occur with the help of so-called $NO_2$-based regeneration, often also called passive regeneration, or through so-called oxygen ($O_2$)-based regeneration, also called active regeneration.

In connection with passive regeneration, nitrogen oxide and carbon oxide are formed in a reaction between carbon and nitrogen dioxide according to e.g. equation 1:

$$NO_2 + C = NO + CO \qquad (1)$$

The passive regeneration, however, is heavily dependent on the availability of nitrogen dioxide. If the supply of nitrogen dioxide is reduced, the regeneration speed is also reduced.

The supply of nitrogen dioxide may e.g. be reduced if the formation of nitrogen dioxide is hampered, which may e.g. occur if one or several components in the aftertreatment system are contaminated by sulphur which normally occurs in at least some types of fuel, e.g. diesel. Competing chemical reactions also hamper the nitrogen dioxide transformation.

The advantage of passive regeneration is that desired reaction speeds and thus the speed at which the filter is emptied are achieved at a lower temperature. Typically, regeneration of the particulate filter during passive regeneration occurs at temperatures in the range of 200° C. to 500° C., although temperatures in the higher part of this interval are normally preferable. Notwithstanding this, compared to the significantly lower temperature interval in active regeneration, this thus constitutes a great advantage if e.g. an SCR catalyst is present, since there is no risk that such a high temperature level is achieved that there is a risk of damage to the SCR catalyst. Nevertheless, it is important that a relatively high temperature is achieved in order for an effective passive regeneration to take place.

In active regeneration, so-called oxygen ($O_2$)-based regeneration, a chemical process takes place mainly according to equation 2:

$$C + O_2 = CO_2 + heat \qquad (2)$$

Thus, carbon plus oxygen are converted, in active regeneration, into carbon dioxide plus heat. This chemical reaction, however, is heavily temperature-dependent and requires relatively high filter temperatures in order for a significant reaction speed to arise at all. Typically, a minimum particulate filter temperature of 500° C. is required, but preferably the filter temperature should be even higher in order for regeneration to occur at the desired speed. The reaction speed for chemical reactions, e.g. the reactions according to equation 1 and 2 above, are also dependent on the concentration of the reactants. If, for example, the concentration of any reactant is low, the reaction speed will be low, and if a reactant is missing, no reaction at all will occur.

Often the maximum temperature which may be used in active regeneration is limited by tolerances for some of the components comprised in the aftertreatment system/exhaust system. For example, often the particulate filter 202 and/or (where applicable) a subsequent SCR catalyst have constructional limitations with regard to the maximum temperature to which they may be subjected. This entails that the active regeneration may have a maximum component temperature which is often undesirably low. Simultaneously, a very high minimum temperature is required in order for any usable reaction speed to arise at all. In active regeneration, the soot load is normally essentially totally burned in the particulate filter 202. This means that a total regeneration of the particulate filter is obtained, following which the soot level in the particulate filter is essentially 0%. Today it is increasingly common for vehicles to be equipped, in addition to a particulate filter 202, with an SCR catalyst 201, which is why active regeneration may entail problems in the form of overheating for the subsequent SCR catalyst treatment process.

It is therefore of utmost importance to be able to stop a rapid increase in temperature in the exhausts before the SCR catalyst. Such a rapidly rising temperature may e.g. be the result of a runaway oxidation in the particulate filer (DFP), which may be inhibited or stopped if the concentration of oxygen into the particulate filter is reduced to a low or zero level. As mentioned above, it is also important, however, that the temperature be regulated in other components in the exhaust system, for example in order to prevent or inhibit local or global excess temperature in the particulate filter (DPF), etc.

Depending on how a vehicle is driven, the concentration/fraction for the exhaust stream resulting from the combustion will vary. If the combustion engine is working hard, the exhaust stream will have a higher concentration/fraction of combustion products and lower concentrations/fractions of combustion reactants, and if the load on the combustion engine is relatively low, the exhaust stream's concentration/fraction will be essentially the reverse. If the vehicle is driven for a longer period of time in such a manner that the exhaust stream contains relatively high concentrations/fractions of undesired combustion products, e.g. sulphur oxides, a degradation of the function of the diesel oxidation catalyst 205 will occur because the reaction of the sulphur which is usually present in the fuel in various forms with the active coating of the diesel oxidation catalyst 205, usually comprising one or several precious metals or other applicable metals such as aluminium. These problems usually arise at low (150° C.) to medium (300° C.) temperatures. At temperatures below 150° C. to 250° C., for example, an SCR catalyst will not function well. On the other hand, if the vehicle is driven for a longer period of time in such a manner that the exhaust stream's temperature maintains relatively high temperatures, this means that active regeneration may take place at the desired speed. However, the temperature in the exhaust stream may not exceed a maximum permitted temperature so that heat sensitive components in the aftertreatment system are damaged as previously mentioned. It is then particularly important to ensure that the concentration of $NO_x$ is maintained at low levels and that the balance $NO2/NO_x$ is optimal.

The concentration C of a substance in a gas may be expressed according to the equation:

$$C = \frac{N}{V},$$

where N is the number of molecules of a given substance and V is the volume, i.e. the number of molecules of a given substance in a given volume. The total concentration $C_{Tot}$, which increases in an ideal gas if the pressure has increased and the temperature is falling, is expressed by the general gas law as $$C_{Tot} = \frac{N_{Tot}}{V},$$

where $N_{Tot}$ is the total number of molecules. The fraction X of a substance is expressed as the relationship between the concentration C and the fraction X as: $C = X \cdot C_{Tot}$. If no chemical reactions take place, the fraction which specifies the proportion of molecules in a volume which belongs to a certain substance is not changed unless additional molecules are mixed with the original volume. This may occur through e.g. diffusion and/or through remixing of gas elements through so-called turbulence. The new molecules which are mixed in may come from e.g. urea and/or diesel injected into the exhaust pipe, which may be evaporated or reacted. They may also come from previously stored substances which are released, e.g. condensed water which is dragged along with the exhaust stream and/or evaporated. Examples of substances in the exhaust system which may be regulated are: carbon monoxide (CO) and nitrogen oxide (NO) which react with e.g. oxygen into carbon dioxide (CO2) and nitrogen dioxide (NO2) respectively.

BRIEF DESCRIPTION OF THE INVENTION

One objective of the present invention is to provide a solution which wholly or partly resolves problems and/or disadvantages with solutions for the regulation of a concentration/fraction of one or several substances in an exhaust stream according to prior art.

According to a first aspect of the invention, the above mentioned objective is achieved with a method for the regulation of a concentration/fraction of one or several substances comprised in an exhaust stream in a motor vehicle through control of its driveline. The motor vehicle comprises: a driveline comprising a combustion engine, which may be connected to an automatic gearbox or a manual gearbox via a clutch device, and an exhaust system arranged for removal of an exhaust stream from the combustion engine; wherein the method comprises the step:

controlling the driveline for activation or deactivation of coasting of the vehicle based on one or several first parameters $P_1$ for the regulation of a concentration/fraction $C_{Ex}/X_{Ex}$ of one or several substances $T_{Ex}$ comprised in the exhaust stream, where at least one of the one or several first parameters $P_1$ are a first concentration/fraction difference between the first concentration/fraction $C_1/X_1$ in the exhaust stream and a reference concentration/fraction $C_{Ref}/X_{Ref}$.

Different embodiments of the above method are disclosed. One method according to the invention may also be implemented in a computer program, which when executed in a computer achieves that the computer carries out the method according to the invention.

According to a second aspect of the invention, the above objective is achieved with a system arranged for the control of one or several functions in a motor vehicle, the motor vehicle which comprises: a driveline comprising a combustion engine which may be connected to a gearbox via a clutch device, and an exhaust system arranged for the removal of an exhaust stream from the combustion engine; where the system comprises a control device arranged to control the driveline for activation or deactivation of coasting of the vehicle based on one or several first parameters $P_1$ for the regulation of a concentration/fraction $C_{Ex}/X_{Ex}$ of one or several substances $T_{Ex}$ comprised in the exhaust stream, where at least one of the one or several first parameters $P_1$ is a first concentration/fraction difference between the first concentration/fraction $C_1/X_1$ in the exhaust stream and a reference concentration/fraction $C_{Ref}/X_{Ref}$.

The above mentioned system is preferably arranged in a motor vehicle, such as a bus, a truck or another similar motor vehicle.

With a method or a system according to the present invention, an improved solution is obtained for the regulation/control of a concentration/fraction of one or several substances comprised in an exhaust stream. For example, the invention enables the regulation of the concentration/fraction of one or several substances comprised in such operating conditions where regulation of the concentration/fraction has not been possible or sufficient with solutions according to prior art.

With a method for the regulation of the concentration/fraction of substances according to the present invention, components in the exhaust system, such as particulate filters and catalysts, may work efficiently since the concentration/fraction of substances comprised in the exhaust system may efficiently and accurately be adjusted to the components' optimal working concentration/fraction. The risk that components in the exhaust system are damaged due to e.g. overheating and contamination is thus also reduced.

Further, the invention provides a more fuel effective method for achieving a desired concentration/fraction of substances comprised, or for maintaining a current concentration/fraction of substances comprised in the exhaust stream compared to prior art. By regulating the concentration/fraction of substances comprised through control of the driveline according to the invention, measures resulting in big fuel consumption may be avoided, such as activation of an external heater or engine control prioritising the concentration/fraction over the engine's efficiency.

Another advantage of the invention is that it is not necessary to equip the vehicle with further parts/components in order to achieve the advantages of the invention since already existing parts/components in the vehicle may be used, which entails a great cost saving.

Further advantages and embodiments of the invention are set out in the following detailed description.

BRIEF DESCRIPTION OF FIGURES

The present invention is described with reference to the enclosed figures where.

DETAILED DESCRIPTION OF THE INVENTION

Figure 2:
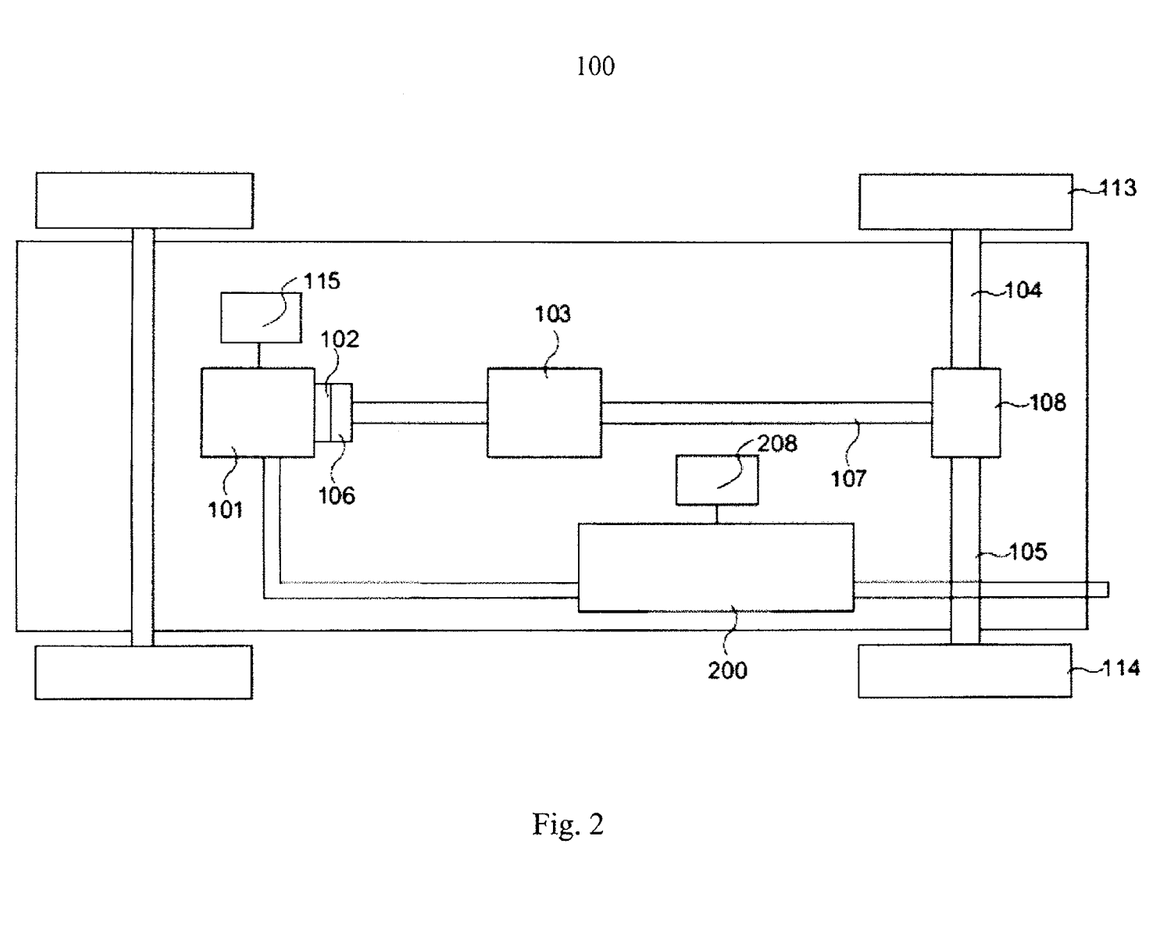
FIG. 2 is a schematic diagram of an example vehicle.

FIG. 2 is a schematic diagram of a motor vehicle 100, such as a truck, bus or other similar motor vehicle. The vehicle 100 schematically shown in FIG. 2 comprises a pair of front wheels 111, 112 and a pair of rear wheels including driving wheels 113, 114. The vehicle also comprises a driveline with a combustion engine 101 (e.g. a diesel engine), which via an output shaft 102 on the combustion engine is connected to a gearbox 103, for example via a clutch device 106. The clutch device may consist of an automatically controlled clutch and be controlled by the vehicle's control system via a control device 115, 208, which may also control the gearbox 103. An output shaft 107 from the gearbox 103 drives the driving wheels 113, 114 via a final drive 108, such as a differential, and drive shafts 104, 105 connected to the final drive 108.

The vehicle 100 also has an exhaust system arranged to remove an exhaust stream generated by the combustion engine 101 on a combustion in the same. As showed in FIG. 1, the exhaust system may comprise an aftertreatment system (exhaust purification system) for the treatment (purification) of exhaust emissions from the combustion engine 101. However, it is not necessary for the exhaust system to comprise such an aftertreatment system. In addition, the exhaust system may comprise other parts/components such as a turbo, a silencer system, and gas flow systems for EGR.

The gearbox 103 is usually a manual gearbox; an automatic gearbox, such as an automatic gearbox, automatic manual gearbox (Automatic Manual Transmission, AMT) or double clutch gearbox (Double Clutch Transmission, DCT); or a continuous variable gearbox (Continuous Variable Transmission/Infinitely Variable gearbox, CVT/IVT).

A manual gearbox 103 is a gearbox with a number of discrete gears and arranged to be manoeuvred by the driver for engagement or disengagement of gears (e.g. forward and reverse gears).

An automatic gearbox also has a number of gears, i.e. it comprises several discrete gears. However, it differs from a manual gearbox in that it is controlled/manoeuvred by a control system comprising one or several control devices, also called ECUs (Electronic Control Unit). The control device or ECU is arranged to control the gearbox 103, for example on a shift from gear selection at a certain speed with a certain running resistance. Also, the ECU may measure the speed and torque of the engine 101 and the condition of the gearbox. Information from the engine or the gearbox may be sent to the ECU in the form of electric communications signals via, for example, a so-called CAN (Controller Area Network) bus installed in the motor vehicle 100.

The gearbox 103 has been illustrated schematically as one device. However, it should be noted that the gearbox may also physically consist of several cooperating gearboxes, for example a so-called range gearbox, a main gearbox and a split gearbox, which are arranged along the vehicle's driveline. Gearboxes according to the above may comprise any number of suitable discrete gears. Today's gearboxes for heavy goods vehicles usually have twelve forward gears, two reverse gears and one neutral gear.

A continuously variable gearbox, also called a CVT gearbox or IVT gearbox, is another type of well known gearbox which differs from the previous gearbox types since it does not have a number of discrete gears corresponding to different gearings but instead has a continuously variable gearing. In this type of gearbox, gearing may thus within certain limits be controlled to the exact gearing desired.

In relation to upshifts and downshifts, an upshift means that a higher possible gear in the gearbox is selected while a downshift means that a lower possible gear in the gearbox is selected. This applies to gearboxes with several discrete gears. For continuously variable gearboxes, "fictitious" gear steps may be defined and shifting gears may occur in the same manner as for a gearbox with discrete gear steps. However, the usual way of controlling such a continuously variable gearbox is to let the gearing vary depending on other relevant parameters. The control of such a gearbox is usually integrated with the control of the combustion engine's speed and torque, i.e. its operating point. A common method is to let control of the continuously variable gearbox be based on a current driving power requirement, e.g. calculated based on a gas pedal position and a speed for the vehicle, and which operating point that gives the best effect in order to achieve the driving power requirement. Gearing in the continuously variable gearbox thus becomes a result of which engine speed leads to the optimal operating point for the current driving power requirement. Aspects other than efficiency may also be taken into account in the choice of operating point for the engine. These may be e.g. driveability-related aspects, such as torque response times, i.e. how long it would take to achieve a higher driving wheel torque, or how much torque may be obtained during a certain time period.

One method according to the present invention for the regulation of a concentration/fraction in the exhaust stream comprising the step: control of a driveline for activation or deactivation of coasting of the vehicle based on one or several first parameters $P_1$ for the regulation of a concentration/fraction $C_{Ex}/X_{Ex}$ of one or several substances $T_{Ex}$ in the exhaust stream, where at least one of the one or several first parameters $P_1$ are a first concentration/fraction difference between the first concentration/fraction $C_1/X_1$ in the exhaust stream and a reference concentration/fraction $C_{Ref}/X_{Ref}$. The reference concentration/fraction $C_{Ref}/X_{Ref}$ is a desired concentration/fraction in the exhaust stream.

Activation of coasting entails that the vehicle's engine 101 is mechanically disconnected from the vehicle's driving wheels 110, 111, i.e. that the driveline is opened, while deactivation of coasting entails that the driveline is closed. Disconnection of the driving wheels from the engine may, for example, be achieved by putting the gearbox 103 in a neutral gear, or by opening the clutch device 106. In other words, essentially no power is transmitted through the gearbox from the engine to the driving wheels during coasting.

Control of a driveline for activation or deactivation of coasting means that a control system controls the driveline for this purpose, alternatively that a driver of the vehicle activates/deactivates coasting guided by a presentation/indication system. The presentation/indication system is arranged to present/indicate to the driver when it is suitable to activate/deactivate coasting according to the previous algorithm for control of the driveline. Thus the presentation/indication system entails a driver support for the driver ("driver support") while driving the vehicle. The presentation may involve visual, audio or tactile presentation/indication or combinations thereof with suitable arrangements for this purpose. Activation/deactivation of coasting may take place with a suitable control device which is manoeuvrable by the driver, such as a control button, a joystick, a control pad, a foot switch, etc.

The one or several first parameters $P_1$ are preferably used as in-parameters for a control algorithm arranged to control the concentration/fraction in the exhaust stream at a desired value through control of the driveline (e.g. gearbox and clutch). The control algorithm may be of many different types and may be an algorithm which only looks at the first parameter and uses one or several threshold values (e.g. one higher and one lower threshold value) to determine which control measure should be taken. A more advanced control algorithm also takes into account other variables as explained in the description below.

The use of one or several first parameters $P_1$ for the regulation of a concentration/fraction of one or several substances in the exhaust stream through control of coasting, the possibility of maintaining the concentration/fraction into or out of e.g. a catalyst at the desired level is obtained, which thus guarantees that certain emission levels from the vehicle stay below the statutory limit values. This is also a fuel effective manner of controlling the concentration/fraction of substances compared to other measures such as deteriorating the combustion efficiency in the engine.

The exhaust stream is the gas stream which leaves a combustion engine and is led out via the exhaust system's different components to the surrounding atmosphere. The exhaust stream may to some extent be recirculated (so-called EGR), expanded over a turbine in order to generate a mechanical energy (e.g. to a turbo compressor or for the propulsion of the vehicle), expanded over an exhaust brake damper (in order to increase losses in the engine and brake the vehicle or in order to generate warmer exhausts to optimise the exhaust treatment), cooled over an WHR plant and/or purified in a more or less advanced exhaust treatment plant.

The components in the exhaust system in which the concentration/fraction and temperature in/on the exhaust stream (or the bulk flow of the exhaust stream) may need to be regulated are according to one embodiment of the invention: the high pressure part of the exhaust and EGR system (upstream of the turbo turbine) and pipe elements in the low pressure part before and after restrictions, such as an exhaust brake, catalyst or catalyst bypass and after urea and HC dosage systems. The concentration/fraction in the gas in catalysts (e.g. DOC, ASC and SCR), traps (e.g. NOx trap) and filters, both bulk and those inside the boundary layer against the component surface, may need to be regulated.

Further, according to one embodiment of the invention, the first concentration/fraction $C_1/X_1$ and/or the second concentration/fraction $C_2/X_2$ is a concentration/fraction of one or several substances from the group comprising: oxygen $O_2$, carbon dioxide $CO_2$, carbon oxide CO, sulphur oxides $SO_x$, nitrogen oxides $NO_x$, nitrogen oxide NO, nitrogen dioxide $NO_2$, nitrous oxide $N_2O$, ammonia $NH_3$; and particles such as soot, HC drops and ash.

Preferred concentrations/fractions in the exhaust pipe after the final exhaust treatment step (the step immediately after before the exhausts leave the exhaust pipe, i.e. the step following which the exhaust emissions must meet the statutory requirements) are those which, with a minimal total fuel and urea consumption, meet the statutory emission requirements. The preferred values for a $NO_2/NO_x$ ratio entering the SCR catalyst are around 50%, for example between 40-60%, for the best conversion grade of $NO_x$ to be achieved. The preferred $NO_2$ content upstream of the particulate filter (DPF), however, is heavily dependent on temperature and the $NO_x/PM$ relationship. Further, certain components in the exhaust system are sensitive to certain substances in certain phases. For example, $NO_x$ sensors are sensitive to water in liquid form. If the sensors come into contact with liquid water, there is a risk they may be damaged, which is why the preferred concentration of liquid water drops in this case is zero. In order to achieve this preferred concentration of liquid water drops, the preferred concentration margin, i.e. the difference between the concentration of water in gaseous form in the exhausts and the concentration of evaporated water on the liquid surface, is maximised during an integrated period of time.

Other ways of regulating the concentration/fraction with a method according to the present invention is, for example, to reduce the oxygen concentration in the exhaust system so that a local or global excess temperature is prevented in components such as the particulate filter, the diesel oxidation catalyst, the SCR dosage device and the SCR catalyst.

According to one embodiment of the invention, the one or several first parameters $P_1$ are selected from a group comprising:

- a first concentration/fraction $C_1/X_1$ which may be a concentration/fraction in an area of the exhaust stream or a concentration/fraction in the exhaust stream on/nearest a surface or substrate in any part or component of the exhaust system, such as a particulate filter, catalyst, silencer, sensor etc.; and
- a second current concentration/fraction difference between the first concentration/fraction $C_1/X_1$ and a concentration/fraction $C_2/X_2$ in the exhaust system. The second concentration/fraction $C_2/X_2$ is a different concentration/fraction in the exhaust stream from the first concentration/fraction $C_1/X_1$. However, the second concentration/fraction $C_2/X_2$ may be a concentration/fraction in an area of the exhaust stream.

According to another embodiment of the invention, one or several of the first parameters $P_1$ is a time derivative and/or time integral of the first concentration/fraction $C_1/X_1$, or the first concentration/fraction difference, or the second concentration/fraction difference. The use of a time derivative is advantageous if the control system is to react quickly to a concentration/fraction change, while the use of a time integral instead entails that the control system takes into consideration long term trends in the concentration/fraction change, which is advantageous for long term control of the concentration/fraction in the exhaust system The above mentioned current concentrations/fractions and concentration/fraction differences and functions thereof may be based on sensor values obtained from one or several sensors arranged at, in connection with, or inside the exhaust system. Signals from sensors may be sent over e.g. a communications bus or a wireless link to one or several control devices for signal processing. Also, the concentrations/fractions and concentration/fraction differences as well as functions thereof may be based on so-called virtual sensors, i.e. (current) sensor values which are calculated with other real sensor signals with the use of one or several sensor models.

The advantage of using current concentrations/fractions and concentration/fraction differences and functions thereof is that these may be used directly for the determination of the first parameter $P_1$ without complex or resource-demanding calculations with the use of various simulation models. Thus, these current values may also be obtained quickly.

According to another embodiment of the invention, any of the one or several first parameters $P_1$ are calculated (predicted) values selected from a group comprising:

- one calculated first concentration/fraction $C_1/X_1$ which may be a concentration/fraction in an area of the exhaust stream or a concentration/fraction in the exhaust stream on/nearest a surface or substrate in any part or component of the exhaust system, such as a particulate filter, catalyst, silencer, sensor, etc.;
- a first calculated concentration/fraction difference between the first concentration/fraction $C_1/X_1$ and a second reference concentration/fraction $C_{Ref2}/X_{Ref2}$ in the exhaust stream. The second reference concentration/fraction $C_{Ref2}/X_{Ref2}$ is a desired concentration/fraction in e.g. a component, such as a particulate filter or a catalyst, in the exhaust system in order for it to function as well as possible or not to be damaged;
- a second calculated concentration/fraction difference between the first concentration/fraction $C_1/X_1$ and a concentration/fraction $C_2/X_2$ in the exhaust stream. The second concentration/fraction $C_2/X_2$ is another concentration/fraction in the exhaust system than the first concentration/fraction $C_1/X_1$. However, the second concentration/fraction $C_2/X_2$ may also be a concentration/fraction in an area of the exhaust stream or a concentration/fraction in the exhaust stream on/nearest a surface or substrate in any part or component of the exhaust stream such as a particulate filter, catalyst, silencer, sensor, etc.;
- a third calculated concentration/fraction difference between the second predicted concentration/fraction difference and a reference concentration/fraction $C_{Ref}/X_{Ref}$ in the exhaust system; and
- a time derivative and/or a time integral of the calculated first concentration/fraction $C_1/X_1$, or the first calculated concentration/fraction difference, or the second calculated concentration/fraction difference, or the third calculated concentration/fraction difference. The use of a time derivative is advantageous if the control system is to react quickly to a concentration/fraction change, while the use of a time integral instead entails that the control system takes into consideration long term trends in the concentration/fraction change, which is advantageous for long term control of the concentration/fraction in the exhaust stream.

By using one or several first calculated parameters $P_1$, information is obtained about how the relevant parameters will vary over time, which means that the system for the regulation of the concentration/fraction of substances in the exhaust stream may be controlled so that the desired concentration/fraction may be achieved in the best possible manner in the future. This applies in particular to slow systems in which a change of a concentration/fraction takes a long time to change, e.g. via storage in catalysts or other components, which require early measures for the avoidance of overshoots in the regulation of a concentration/fraction.

Calculated parameters means that they are calculated or simulated in advance based on (mathematical) models of the vehicle and/or the components comprised in the vehicle. Based on one or several calculated first parameters $P_1$, a control strategy for the control of the driveline may be selected among several possible control strategies. By calculating/simulating how the first parameter $P_1$ will vary over the road sections lying ahead for the vehicle, according to one or several different control strategies, the control strategy which achieves certain requirements, e.g. that the concentration/fraction remains within a predefined limit value while being optimal from another perspective such as fuel and/or urea consumption, may be selected. The above therefore entails that the one or several first parameters $P_1$ may also be calculated based on one or several different future control strategies for the gearbox. This embodiment thus pertains to a feedback method where one or several first parameters $P_1$ are used for the calculation of one or several control strategies based on one or several possible operating points, i.e. operating points which may possibly be used having regard to other requirements such as driveability or fuel consumption. The one or several control strategies are subsequently used in order to calculate new one or several first parameters or in order to update the existing parameters.

Further, it should be noted that even if only one control strategy is calculated, information derived from this single control strategy may be used by the control system in order to determine whether it may reasonably be used or whether it is better to let the vehicle be driven with the current operating point for the control of the driveline.

As mentioned above, the inventors have thus realised that the one or several calculated first parameters $P_1$ may be calculated over a road section ahead of the vehicle, for example by simulation over the road section ahead. According to this embodiment, the calculated first parameters $P_1$ may be determined based on one or several vehicle-specific and/or road-specific data for the vehicle. These may preferably be selected from the group comprising: inclination of the road ahead of the vehicle, curve radii of the road section ahead, speed limits of the road section ahead; motor vehicle weight; rolling resistance of the motor vehicle; air resistance of the motor vehicle; engine specific data such as maximum output, minimum output, maximum torque, minimum torque, exhaust flow, exhaust gas recirculation content and lambda values (i.e. air/fuel mixture); and installation-specific data such as the possible accumulation of substances and/or release of substances and/or conversion of substances in the exhaust system and a surface in the exhaust system in contact with the exhaust stream. Further, driver-interactive data which is related to the driver's driving style in connection with the calculation of the one or several first parameters $P_1$ may be used so that the vehicle's future behaviour is taken into account when the calculation is made. Examples of driver-interactive data include: the use of blinkers, gas pedal position, and use of brakes.

One advantage with the use of vehicle-specific and/or road-specific data for control is that the system may determine in advance whether any control strategy for one or several functions (e.g. gearing, external load, external heater, regulations of flow, etc.) needs to be used for the concentration/fraction not to end up outside a preferred interval. Thus, the use of unnecessary control strategies is avoided and also the system may act proactively in the event any measure should be required, i.e. the system may act in advance.

According to one special embodiment, the first concentration/fraction $C_1/X_1$ is a concentration/fraction in the gas stream, or a concentration/fraction over a liquid or a particle in the exhaust stream, and the second concentration/fraction $C_2/X_2$ is a concentration/fraction in the exhaust stream on/nearest a surface or substrate in the exhaust system. The surface concentration/fraction is a concentration/fraction in the gas on/nearest a surface of the exhaust system or on a part thereof, which impacts the transport of the substance to and from the surface and the chemical reactions on the surface. The concentration/fraction over a liquid refers to the concentration/fraction on a surface in the exhaust system. This concentration/fraction over a liquid will impact the transport of substance amounts to or from the liquid, e.g. condensation or evaporation. The liquid may in this case consist of e.g. urea, water or fuel. The concentration/fraction immediately over a particle in the gas will on the other hand determine the reaction speed, such as growth, decomposition or oxidation, for the particle which in this case may be e.g. a soot or urea particle in the exhaust system.

According to another embodiment, the first concentration/fraction $C_1/X_1$ is a concentration/fraction in the exhaust stream upstream of an area in the exhaust system at which a concentration/fraction is desired to be obtained. This is especially advantageous where the conversion level of a component comprised in the exhaust system (e.g. a particulate filter or catalyst) is unambiguous, so that the output concentration/fraction will be determined by the input concentration/fraction and/or the fraction entering the component. This is the case in e.g. an equilibrium-controlled conversion of NO into NO2 in a diesel oxidation catalyst (DOC) or conversion of $NO_x$ in an SCR catalyst at high temperatures. It is also particularly advantageous if a particulate filter (DPF) is about to overheat and the overheating process may be stopped by removing oxygen into the particulate filter.

Further, it should be understood that the one or first parameters $P_1$ used in the control of the driveline may consist of only current values, or consist of only calculated values, or be a combination of current and calculated values depending on the application.

Activation or deactivation of coasting may, according to one embodiment of the invention, take place with the use of one or several threshold values against which the one or several first parameters $P_1$ are compared. The threshold values usually specify limit values which must not be undershot or exceeded and if the concentration/fraction passes such a threshold value a concentration/fraction regulating measure is taken by the system. If the concentration/fraction-adjusting measure needs to be taken, coasting is activated if a value for at least one of the one or several first parameters $P_1$ passes a threshold value $P_T$ according to one embodiment of the invention.

Other additional parameters which are useful in the control of the driveline for activation or deactivation of coasting in the regulation of the concentration/fraction in the exhaust system are:

- a requested engine power since coasting is activated when the requested engine or propulsion power is low. Otherwise the driving experience/driveability becomes too poor;
- a requested engine torque analogously with the above reasoning;
- a calculated speed and/or a calculated road inclination for the motor vehicles over the road section ahead. Coasting in other situations than when the vehicle may maintain, or essentially maintain, a desired speed results in very poor driveability and is therefore not desirable.

It should be realised that the one or several first parameters $P_1$ are not alone in determining whether coasting should be activated. Usually, the most important condition is that the vehicle must be able to maintain a desired speed with coasting activated since driveability is otherwise too poor. Other conditions are also relevant, which means that real systems use the concentration/fraction in the exhaust stream as one of several parameters when deciding whether or not coasting should be activated. Deactivation of coasting may, however, be carried out independently of the vehicle's speed, the road inclination, etc.

When controlling the concentration/fraction with the one or several first parameters, measures may be taken to control the engine when the decoupling is activated for quicker and more precise regulation. If gearing is desired, the engine speed is increased and thus the engine load is increased, which leads to a reduction in the total concentration $C_{Tot}$ in the exhaust stream and an increase in the exhaust flow; if on the other hand the gearing is reduced, the engine speed decreases and thus the engine's load and the exhaust flow increase which leads to a reduction of the total concentration $C_{Tot}$. All concentrations/fractions of different substances do not behave in the same manner on a load increase or a load decrease. Based on knowledge regarding fundamental combustion relationships, emission chemistry, the exhaust treatment system and the engine's control strategy with respect to e.g. the air/fuel relationship, load pressure, EGR content, injection time(s), and dosage of substances in the exhaust system, a person skilled in the art knows how engine load and engine speed should be varied in order to achieve a change of a given concentration or fraction. With respect to a change in a concentration/fraction over catalysts in the exhaust system, their efficiency generally deteriorates with an increased flow and falling temperatures. With a given drive power requirement, generally the efficiency will thus decrease when the engine speed increases. However, there are exceptions, and therefore in practice virtual sensors are also used here in order to decide in which direction the engine speed should be changed. In practice, this is realised with the use of one or several virtual sensors arranged to calculate a quantity such as a concentration or fraction of substances. With the use of sensor values from the sensors, the engine load and the engine speed may be controlled for the regulation of a concentration/fraction.

The inventors have also realised that the one or several first parameters $P_1$ are suitable for the control of other functions in the vehicle for the regulation of the concentration/fraction at the same time as coasting is activated. These functions must have a direct or indirect impact on the concentration/fraction. Thus, the regulation of the concentration/fraction may be more efficient and faster. Suitable functions are related to: external load; the conversion of exhaust heat into energy; external heating of the exhaust system; injection of fuel into the engine; injection of fuel, urea or other suitable liquids to the exhaust system; and regulation of the exhaust flow. It should be realised that the one or several first parameters $P_1$ may be used to control such a function or a combination of two or several such functions.

Examples of external loads which may be controlled with the one or several first parameters $P_1$ when coasting is activated are auxiliaries such as a water pump, fan or compressor; generator; hybrid generator or similar energy recycling system; retarder, exhaust brake or other auxiliary brake. According to the invention, the external load must be arranged on the engine side of the clutch device/gearbox, since all loads which are located on the output side of the gearbox will not be able to impact the engine when coasting is activated since the driveline is open.

In coasting, the operating point in the engine may be selected freely with respect to the engine speed, while the system is normally limited to idling load with respect to engine torque. However, with an external load, the engine's torque may be impacted and thus the freedom in selecting an operating point when coasting may be further increased. In some cases, the external load is of the "on" or "off" type, i.e. it is either activated or not, and in these cases the control and calculation of the operating point is limited to determining whether or not the external load should be activated.

The one or several first parameters $P_1$ may be used for the control of a system arranged for conversion of exhaust heat into energy (Waste Heat Recovery, WHR). The regulation of the temperature with the system for the conversion of exhaust heat into energy takes place, according to one embodiment, by maximum energy in relation to the input energy, or total converted energy, being taken out via the system. This regulation is preferably aimed at maximising the heat conduction into the system and is designed for example as a PID or MPC regulator (Proportional Integral Derivative, PID; Model Predictive Control, MPC).

Further, the one or several first parameters $P_1$ may be used for the control of at least one external heater for the exhaust system. The external heater's task is to increase the concentration/fraction in the exhaust stream. Preferably, the external heater is:
 a burner installed in the exhaust system after the combustion engine's cylinders;
 a system arranged for the injection of hydrocarbons for oxidation or combustion on a catalyst placed in the exhaust system;
 an electric heater installed in the exhaust system after the combustion engine's cylinders; or
 any other suitable external heater installed in, or in close connection with the exhaust system.

The external heater is preferably controlled so that a maximum concentration increase is obtained in relation to the energy input or so that the concentration increase is maximised. However, the external heater may instead be controlled so that the concentration increase speed is prioritised. The control of the external heater may be configured as a PID or MPC regulator.

As mentioned above, the one or several first parameters $P_1$ may also be used to control a fuel injection system arranged for the injection of fuel to the combustion engine. This may occur through control of the number of post-injections, the time (CAD) for the post-injections, and the fuel amount per post-injection. The control of the fuel injection system may be implemented as pre-controlled or feedback control with e.g. MAP (matrix based regulation structure), PID or MPC (Model Predictive Control). As a setpoint for this control, a concentration/fraction downstream of the engine as well as a particulate filter (DOC) or a concentration/fraction difference over the particulate filter may be used. In one embodiment, the regulation compensates for the efficiency of reactions in a component comprised in the exhaust system, for example the efficiency for NO into NO2 conversion in a diesel oxidation catalyst. Further, the one or several first parameters $P_1$ may be used for the control of an injection system arranged for the injection of fuel, urea or another suitable liquid to the exhaust system for regulation of the concentration/fraction $C_{Ex}/X_{Ex}$ of one or several substances comprised.

Another factor impacting the concentration/fraction in the exhaust system $$\frac{C_{Ex}}{X_{Ex}}$$

are the characteristics for the exhaust flow in the exhaust stream. For this reason, the one or several first parameters $P_1$ may also be used for the control of the exhaust flow, or one of the exhaust flows depending on the parameter, for example mass transfer coefficients.

Figure 3:
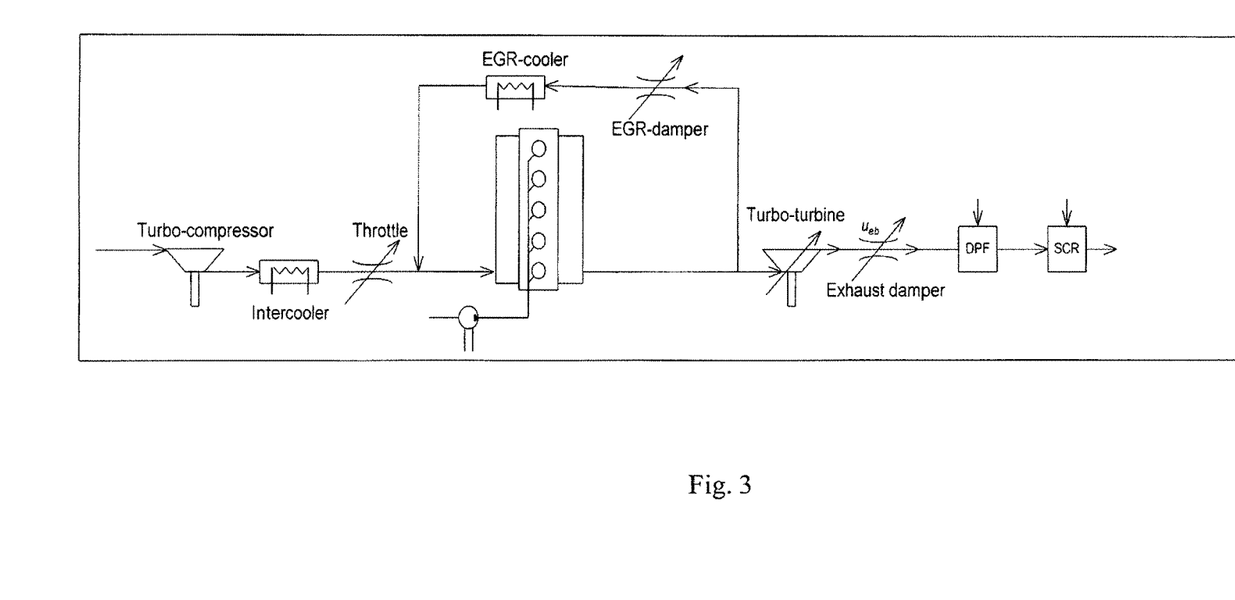
FIG. 3 is a schematic diagram of a gas flow in an engine system.

Control of the exhaust flow may, for example, occur through control of a gas flow system for exhaust gas recirculation (EGR) and/or through control of an intake system for the engine. FIG. 3 shows schematically a general gas flow in an engine system, where the engine system in this example comprises a diesel engine with a turbo and a number of pipes connected to the engine. Air is sucked in from the left in FIG. 3 with an intake system for the engine. The air which is sucked in passes through an intake pipe and is compressed in a turbocharger in order to be cooled subsequently by an intercooler before it passes, in certain cases, a throttle butterfly that regulates the amount of air into the diesel engine. The air is then mixed with recirculated exhausts with a gas flow system for exhaust gas recirculation (EGR) and this mixture is then sucked into the engine's cylinders in order to be mixed with diesel or another fuel before combustion occurs in the engine.

The exhausts from the combustion process then pass through a turbo turbine which sets the turbocharger into motion. Parts of the exhausts, however, enter into an EGR pipe and are led back to the intake pipe via an EGR damper and one or several EGR coolers. The EGR damper's function is to regulate the amount of recirculated exhausts back to the combustion process. When the EGR gases are cooled, the use of EGR will move heat energy from the exhausts to the engine's cooling system. Before the exhausts disappear entirely from the engine system, in some engines they pass through an exhaust damper (if installed) which controls the pressure in an exhaust collector (not shown in the figure). Subsequently the exhausts pass through an aftertreatment system which may contain a diesel particulate filter and/or an SCR catalyst as mentioned previously. If the engine is not heavily loaded, the exhausts will have a lower temperature than desired and thus cool the catalyst. One way of limiting the amount of cooling exhausts is to use a damper arranged in an intake pipe for air to the engine. Thus, the amount of air entering the engine may be limited, which in turn means the exhausts exiting the engine are also limited, which, with a given load, results in warmer exhausts with a usually higher fraction of combustion products. This damper is usually called a throttle butterfly, as mentioned above. The amount of air which the engine consumes is determined to a large extent by the speed of the engine, which in this case means that: the higher the engine speed, the more air flow is required to the engine.

According to the present invention, the one or several parameters $P_1$ may be used to control the gas flow system for exhaust gas recirculation (EGR) and/or the air intake system arranged for the regulation of an air flow to the engine. In addition, the control of the gas flow system for exhaust gas recirculation (EGR) may be controlled with an additional parameter related to emissions produced by the combustion engine. Emissions in this context mean, for example, exhausts and noise. Further, a reduction of the exhaust flow may be combined with an increase of the engine load to change the fraction of a component comprised in the exhaust system. This embodiment may be realised with, for example, pre-controlled or feedback control of an exhaust brake with the use of: a setpoint for the fraction or a value which is a function of the setpoint for the fraction.

Figure 5:
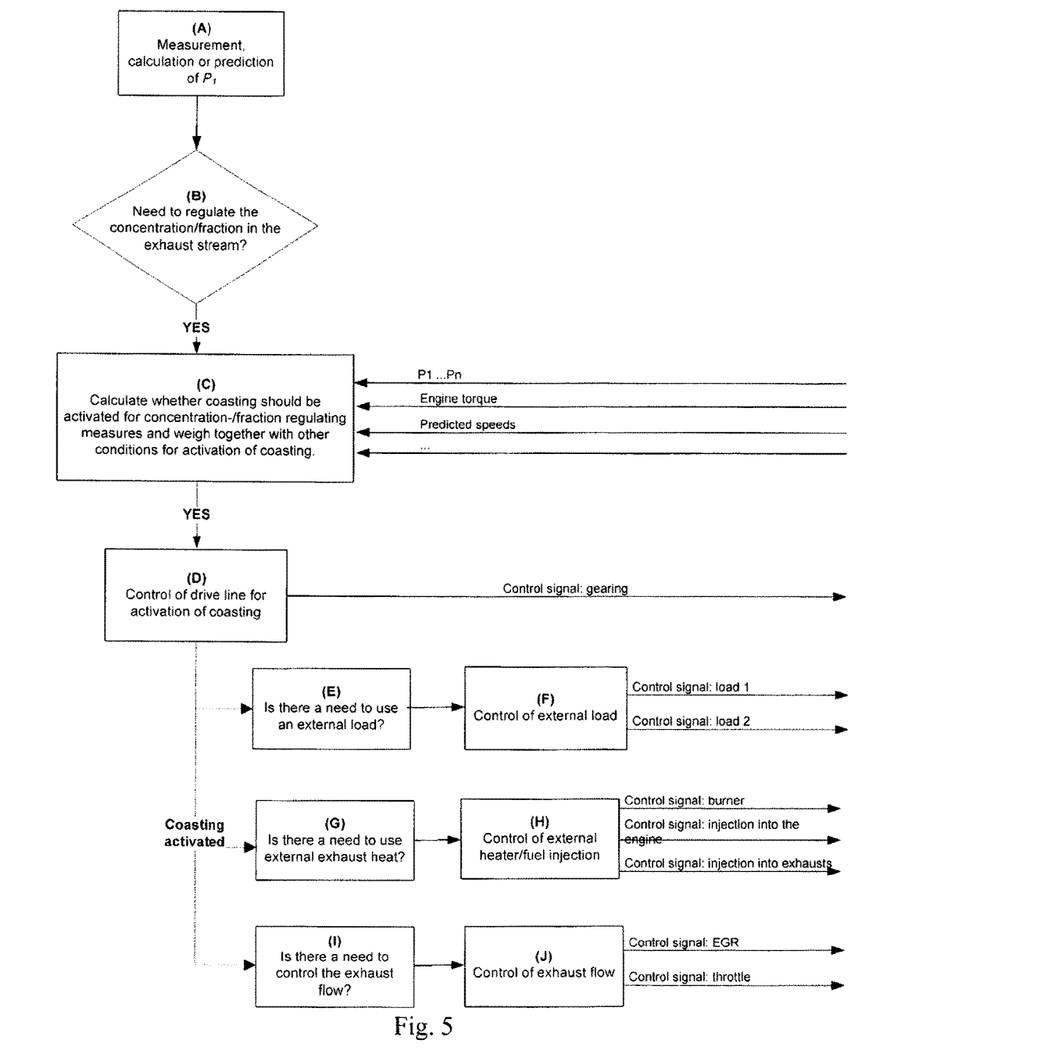
FIG. 5 is a flow diagram of an embodiment of the invention.

Further FIG. 5 shows a flow diagram of an exemplified embodiment of the method according to the invention:

A. At A, the first parameter $P_1$ from other sensor signals (virtual sensor) is measured or calculated. The first parameter $P_1$ may also be calculated over the road section ahead for the vehicle at A.

B. Based on the value of the first parameter $P_1$, at B it is decided whether a concentration/fraction regulating measure needs to be taken. This may occur through e.g. a comparison of the first parameter $P_1$ with a threshold value, or by comparing several predictions of the first parameter $P_1$ with related control strategies and based on these to select which concentration/fraction regulating measure(s) that need to be taken.

C. If a concentration/fraction regulating measure is to be taken, whether coasting should be activated is calculated at C. Other parameters may also be taken into consideration in the calculation of whether or not coasting should be activated, such as requested engine power, requested engine torque, predicted speed, predicted road inclination, etc. As described above, other conditions for the activation of coasting should also be taken into consideration.

D. At D, the driveline is controlled so that coasting is activated, for example by engaging the gearbox in a neutral position, or by opening the clutch device.

E. At E, a check as to whether an external load needs to be used to regulate the concentration/fraction in the exhaust system is carried out.

F. If an external load needs to be used, the external load is controlled at F, so that the desired engine load is achieved.

G. At G, a check as to whether an external heater needs to be used to regulate the concentration/fraction in the exhaust stream is carried out.

H. If an external heater needs to be used, one or several external heaters are controlled at H, so that the desired concentration/fraction is achieved in the exhaust stream, for example by control of a burner, injection of hydrocarbons in the engine or injection of hydrocarbons in the exhausts.

I. At I, a check as to whether the exhaust flow needs to be controlled in order to regulate the concentration/fraction in the exhaust stream is carried out.

J. If the exhaust flow needs to be controlled for the regulation of the concentration/fraction in the exhaust stream, the exhaust flow is controlled at J, so that the desired exhaust flow is achieved, and indirectly makes it possible for the desired concentration/fraction to be achieved in the exhaust stream.

The present invention may be implemented in a control system comprising, for example, a control device arranged to control the entire or parts of a driveline in a motor vehicle 100. Further, the system may comprise additional control devices arranged to control other functions, such as external loads, external heaters, etc. Control devices of the type displayed are normally arranged to receive sensor signals from different parts of the vehicle as well as from other control devices. These control devices are also usually arranged to emit control signals to different vehicle parts and vehicle components. The control devices may also comprise, or be connected to, a calculation device arranged for the calculation/simulation of predicted parameter values.

Generally, control systems in modern vehicles consist of a communications bus system consisting of one or several communications buses for the connection of a number of electronic control devices (ECUs) or controllers 115, 208 and different components arranged on the vehicle. Such a control system may comprise a large number of control devices, and the responsibility for a specific function in the vehicle may be distributed among one or more control devices.

The control usually takes place with programmed instructions. These programmed instructions typically consist of a computer program, which, when it is executed in a computer or control device, causes the computer/control device to carry out the desired control, such as methods according to the present invention. The computer program usually consists of a computer program product, where the computer program product comprises an applicable storage medium 121 with the computer program 109 stored on the storage medium 121. The digital storage medium 121 may e.g. consist of any from the following group: ROM (Read-Only Memory), PROM (Programmable Read-Only Memory), EPROM (Erasable PROM), Flash, EEPROM (Electrically Erasable PROM), a hard disk unit, etc., and may be set up in or in combination with the control device, where the computer program is executed by the control device.

Figure 4:
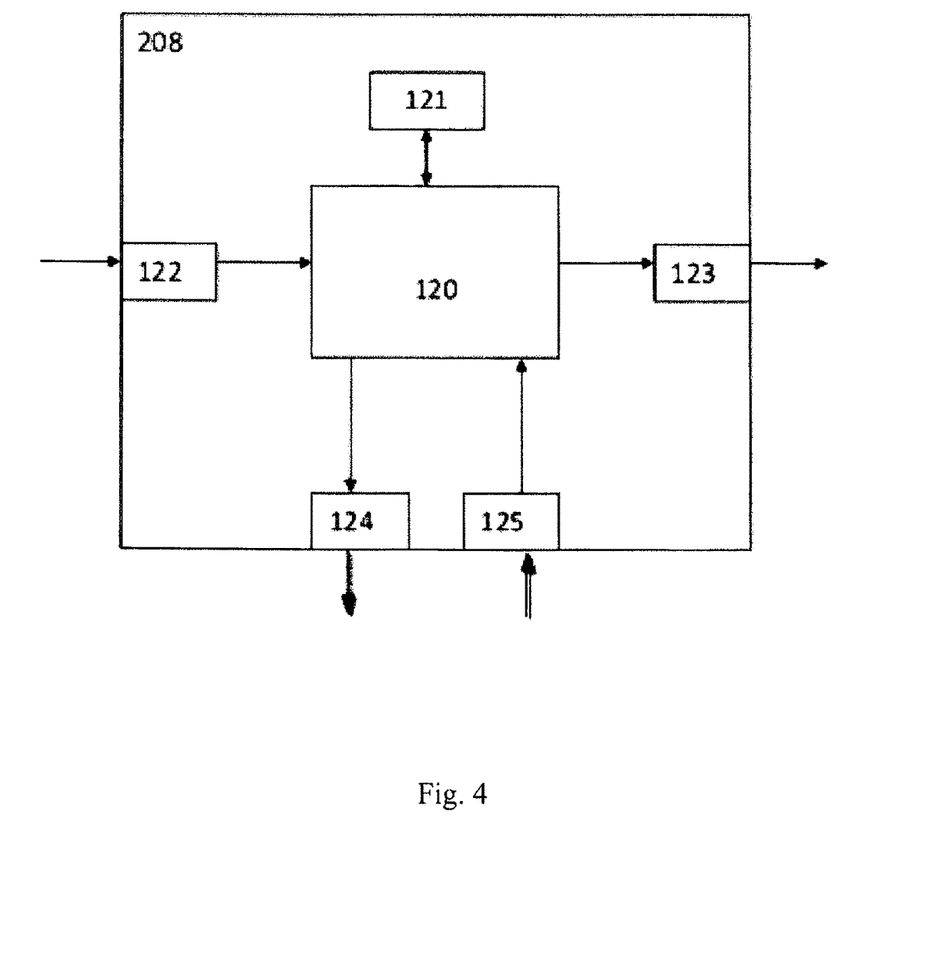
FIG. 4 is a schematic diagram of a control device.

An example control device (control device 208) is displayed in the diagram in FIG. 4, and the control device in turn may comprise a calculation device 120, which may consist of e.g. a suitable type of processor or microcomputer, e.g. a circuit for digital signal processing (Digital Signal Processor, DSP), or a circuit with a predetermined specific function (Application Specific Integrated Circuit, ASIC). The calculation device 120 is connected to a memory device 121, which provides the calculation device with e.g. the stored program code 109 and/or the stored data which the calculation device needs in order to be able to carry out calculations. The calculation device is also arranged to store interim or final results of calculations in the memory device 121.

Further, the control device is equipped with elements/devices 122, 123, 124, 125 for receipt and sending of input and output signals, respectively. These input and output signals may contain waveforms, pulses, or other attributes, which may be detected by the devices for the receipt of input signals as information for processing by the calculation device 120. The devices 123, 124 for sending output signals are arranged to convert the calculation result into the calculation unit 120 to output signals for transfer to other parts of the vehicle's control system and/or the component(s) for which the signals are intended. Each one of the connections to the devices for receipt and sending of input and output signals may consist of one or several of a cable; a data bus, such as a CAN, a MOST (Media Oriented Systems Transport), or any other suitable bus configuration; or of a wireless communications connection.

More specifically, a (control) system according to the present invention comprises a control device arranged to control the driveline for activation or deactivation of coasting based on one or several first parameters $P_1$ for the regulation of a concentration/fraction $C_{Ex}/X_{Ex}$ of one or several substances $T_{Ex}$ comprised in the exhaust stream, where at least one of the one or several first parameters $P_1$ is a first concentration/fraction difference between the first concentration/fraction $C_1/X_1$ in the exhaust stream and a reference concentration/fraction $C_{Ref}/X_{Ref}$. As a person skilled in the art will realise, this system may be implemented in a control system described above. Further, the present invention also pertains to a motor vehicle 100, such as a bus, a truck or a similar motor vehicle, comprising at least one system according to the above.

Finally, it should be realised that the present invention is not limited to the embodiments of the invention described above, but pertains to and comprises all embodiments within the protected scope of the enclosed independent claims.

The invention claimed is:

1. A method for regulation of a concentration/fraction of one or several substances in an exhaust stream in a motor vehicle through control of a driveline of the vehicle, wherein the motor vehicle comprises: a driveline comprising a combustion engine, driving wheels, mechanically connectable and disconnectable from the combustion engine, and an exhaust system configured for removal of an exhaust stream from the combustion engine;

the method comprises the step:
controlling the driveline to activate coasting of the vehicle or to deactivate coasting of the vehicle, based on one or several first parameters $P_1$ for regulation of a concentration/fraction $C_{Ex}/X_{Ex}$ of one or several substances $T_{Ex}$ included in the exhaust stream, at least one of the one or several first parameters $P_1$ are a first concentration/fraction difference between the first concentration/fraction $C_1/X_1$ in the exhaust stream and a reference concentration/fraction $C_{Ref}/X_{Ref}$, wherein coasting is activated by mechanically disconnecting the combustion engine from the driving wheels, and wherein coasting is activated while the vehicle is moving.

2. A method according to claim 1, wherein at least another one of the one or several first parameters $P_1$ is an another first concentration/fraction $C_1/X_1$ or in a second concentration/fraction difference between the another first concentration/fraction $C_1/X_1$ and a second concentration/fraction $C_2/X_2$ in the exhaust stream.

3. A method according to claim 2, wherein the another first concentration/fraction $C_1/X_1$ is a concentration/fraction in the exhaust stream upstream of an area in the exhaust stream at which a concentration/fraction is selected to be obtained.

4. A method according to claim 2, wherein at least another of the one or several first parameters $P_1$ is a time derivative or a time integral of the first concentration/fraction $C_1/X_1$ or the another first concentration/fraction $C_1/X_1$ or the first concentration/fraction difference and, or the second concentration/fraction difference.

5. A method according to claim 2, wherein the another first concentration/fraction $C_1/X_1$ is a concentration/fraction of a gaseous substance or a concentration of fixed particles or liquid drops, and the second concentration/fraction $C_2/X_2$ is a concentration/fraction in the exhaust stream on/nearest a surface or a substrate in the exhaust system.

6. A method according to claim 2, wherein the first concentration/fraction $C_1/X_1$ and/or the second concentration/fraction $C_2/X_2$ is a concentration/fraction of one or several substances from the group comprising: oxygen O2, carbon dioxide CO2, carbon oxide CO, sulphur oxides SOx, nitrogen oxides NOx, nitrogen oxide NO, nitrogen dioxide NO2, nitrous oxide N2O, ammonia NH3; and particles comprising soot, HC drops and ash.

7. A method according to claim 1, further comprising calculating at least one of the one or several first parameters $P_1$ over the road section ahead of the motor vehicle based on one or several vehicle-specific and/or road-specific data for the motor vehicle.

8. A method according to claim 7, wherein the vehicle-specific and/or road-specific data are selected from the group comprising: a road inclination, curve radii, speed limits; a weight of the motor vehicle; a rolling resistance; an air resistance; and engine-specific data comprising maximum output, minimum output, maximum torque, minimum torque, exhaust flow, exhaust recirculation content, lambda values, and injection parameters.

9. A method according to claim 1, wherein the coasting is activated when a value for at least one of the one or several first parameters $P_1$ is below a threshold value $P_T$.

10. A method according to claim 1, wherein the controlling of the driveline for activation or deactivation of the coasting is also based on one or several additional parameters related to any from among the group comprising: a requested engine power; a requested engine torque; a calculated speed and/or a calculated road inclination for the motor vehicle over the road section ahead.

11. A method according to claim 1, wherein the driveline is connected via a clutch of the vehicle to a gearbox of the vehicle; and the coasting is activated through:
engaging the gearbox in a neutral gear via the clutch, or opening of the clutch device.

12. A method according to claim 1, wherein the method further comprises, when coasting is activated:
controlling at least one external load to increase or to reduce the concentration/fraction $C_{Ex}/X_{Ex}$ of the one or several substances in the exhaust stream based on the one or several first parameters $P_1$, wherein the external load is installed on an engine side of the clutch device/gearbox.

13. A method according to claim 12, wherein the external load is one or several external loads selected from the group comprising: a system arranged for the conversion of exhaust heat into energy (WHR); auxiliaries including a water pump, fan or compressor; generator; hybrid generator, energy recycling system; retarder, exhaust brake or other auxiliary brake.

14. A method according to claim 1, wherein the method further comprises, when coasting is activated:
controlling at least one external heater based on the one or several first parameters $P_1$ for the reduction or the increase of the concentration/fraction $C_{Ex}/X_{Ex}$ of one or several substances in the exhaust system.

15. A method according to claim 14, wherein the external heater is selected from the group comprising: a burner installed in the exhaust stream after exhaust exits the combustion engine's cylinders; a system arranged for injection of hydrocarbons for the oxidation or combustion on a catalyst placed in the exhaust system; an electric heater installed in the exhaust stream after exhaust exits the combustion engine's cylinders; and another external heater installed in or in close connection to the exhaust stream.

16. A method according to claim 1, wherein the method further comprises, when coasting is activated:
controlling a fuel injection system configured for injection of fuel to the combustion engine based on the one or several first parameters $P_1$ for the regulation of the temperature $T_{Ex}$ in the exhaust stream.

17. A method according to claim 1, wherein the method also comprises:
controlling an injection system configured for injection of fuel, urea or another liquid to the exhaust stream based on the one or several first parameters $P_1$ for the regulation of the concentration/fraction $C_{Ex}/X_{Ex}$ of one or several substances in the exhaust stream.

18. A method according to claim 1, wherein the method further comprises, when coasting is activated:
controlling an exhaust flow in the exhaust stream, or of one parameter depending on the exhaust flow, based on the one or several first parameters $P_1$ for the regulation of the concentration/fraction $C_{Ex}/X_{Ex}$ of one or several substances in the exhaust stream.

19. A method according to claim 18, wherein controlling the exhaust stream comprises:
controlling a gas flow system for exhaust gas recirculation (EGR) which is configured for the combustion engine based on the one or several parameters $P_1$ for the regulation of the concentration/fraction $C_{Ex}/X_{Ex}$ of one or several substances in the exhaust stream; and/or
controlling an intake system arranged for regulation of an air flow to the combustion engine based on the one or several first parameters $P_1$ for the regulation of the concentration/fraction $C_{Ex}/X_{Ex}$ of one or several substances in the exhaust stream.

20. A method according to claim 19, wherein controlling the gas flow system for exhaust gas recirculation (EGR) and/or controlling the intake system is also based on an additional parameter related to emissions produced by the combustion engine.

21. A computer program product comprising a non-transitory computer readable medium and a computer program, wherein the computer program is comprised in the non-transitory computer readable medium and the computer program comprises a program code which, when the program code is executed in a computer, causes the computer to carry out the method according to claim 1.

22. A system configured for controlling a driveline in a motor vehicle, comprising:
a driveline comprising a combustion engine, and an exhaust system configured for removal of an exhaust stream from the combustion engine; and
a control device configured to control the driveline to activate or to deactivate coasting of the vehicle based on one or several first parameters $P_1$ for the regulation of a concentration/fraction $C_{Ex}/X_{Ex}$ of one or several substances $T_{Ex}$ in the exhaust stream, wherein at least one of the one or several first parameters $P_1$ is a first concentration/fraction difference between the first concentration/fraction $C_1/X_1$ in the exhaust stream and a reference concentration/fraction $C_{Ref}/X_{Ref}$,
wherein coasting is activated by mechanically disconnecting the combustion engine from the driving wheels while the vehicle is moving.

23. A motor vehicle comprising at least one system according to claim 22.

* * * * *